(12) United States Patent
Cloft et al.

(10) Patent No.: US 8,459,597 B2
(45) Date of Patent: Jun. 11, 2013

(54) INTEGRAL SUCTION DEVICE WITH ACOUSTIC PANEL

(75) Inventors: Thomas G. Cloft, Glastonbury, CT (US); Richard H. Wiley, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 12/768,115

(22) Filed: Apr. 27, 2010

(65) Prior Publication Data

US 2010/0205975 A1 Aug. 19, 2010

Related U.S. Application Data

(63) Continuation of application No. 11/754,518, filed on May 29, 2007, now Pat. No. 7,766,280.

(51) Int. Cl.
*B64C 21/06* (2006.01)

(52) U.S. Cl.
USPC .......................................................... 244/208

(58) Field of Classification Search
USPC ................ 244/208, 209, 54, 53 B; 137/15.1, 137/15.2; 60/226.1
See application file for complete search history.

(56) References Cited

U.S. PATENT DOCUMENTS

| | | |
|---|---|---|
| 3,702,121 A | 11/1972 | Millman |
| 4,156,344 A | 5/1979 | Cuthbertson et al. |
| 4,240,250 A | 12/1980 | Harris |
| 4,452,335 A | 6/1984 | Mathews et al. |
| 4,749,150 A | 6/1988 | Rose et al. |
| 4,972,672 A | 11/1990 | Sanderson et al. |
| 4,993,663 A | 2/1991 | Lahti et al. |
| 5,000,399 A | 3/1991 | Readnour et al. |
| 5,059,093 A | 10/1991 | Khalid et al. |
| 5,136,837 A | 8/1992 | Davison |
| 5,263,667 A | 11/1993 | Horstman |
| 5,437,151 A * | 8/1995 | Martin ............................ 60/233 |
| 5,535,967 A | 7/1996 | Beauchamp et al. |
| 5,557,917 A * | 9/1996 | Jaw ................................ 60/779 |
| 5,618,363 A | 4/1997 | Mullender et al. |
| 5,702,231 A | 12/1997 | Dougherty |
| 5,743,488 A | 4/1998 | Rolston et al. |
| 5,743,493 A | 4/1998 | McCaughan |
| 5,934,611 A | 8/1999 | Tindell et al. |
| 5,971,000 A * | 10/1999 | Koncsek et al. ................. 137/14 |
| 6,122,892 A | 9/2000 | Gonidec et al. |
| 6,179,251 B1 | 1/2001 | Tindell et al. |
| 6,428,271 B1 | 8/2002 | Ress, Jr. et al. |

(Continued)

FOREIGN PATENT DOCUMENTS

WO 99/20526 4/1999

OTHER PUBLICATIONS

Extended European Search Report for EP Application No. EP08251753.3 dated Aug. 5, 2011.

*Primary Examiner* — Tien Dinh

(74) *Attorney, Agent, or Firm* — Carlson, Gaskey & Olds, P.C.

(57) ABSTRACT

An inlet flow control system disposed within a nacelle includes a panel on an inner surface of that nacelle. The panel includes a noise attenuation layer that dissipates noise energy. A vacuum source generates a pressure differential across the noise attenuation layer for drawing airflow through the panel and away from an inner surface of the nacelle.

7 Claims, 3 Drawing Sheets

U.S. PATENT DOCUMENTS

| | | |
|---|---|---|
| 6,634,595 B2 | 10/2003 | Koncsek et al. |
| 6,752,358 B1 | 6/2004 | Williams et al. |
| 6,942,181 B2 | 9/2005 | Dionne |
| 6,971,229 B2 | 12/2005 | Lair |
| 7,048,230 B2 | 5/2006 | Meyer |
| 2003/0150962 A1 | 8/2003 | Orban |
| 2006/0024154 A1 | 2/2006 | Costa et al. |

\* cited by examiner

INTEGRAL SUCTION DEVICE WITH ACOUSTIC PANEL

REFERENCE TO RELATED APPLICATION

This application is a continuation of U.S. application Ser. No. 11/754,518 filed on May 29, 2007 now U.S. Pat No. 7,766,280.

BACKGROUND OF THE INVENTION

This invention generally relates to an air inlet control system for a gas turbine engine.

Operation of a gas turning engine requires intake of air for the combustion process. Incoming air is directed into the engine by a nacelle that defines a leading edge and an intake opening for incoming air. During most operating conditions air flow along the interior surface of the nacelle is turbulent resulting in a thin boundary layer. However, in some instances such as during low speed high power operation and high angle of attack, local flow fields result in an increase in boundary layer thickness along the surface of the nacelle. At certain airflows the thickened boundary layer can separate from the inner surface of the nacelle creating vortices and non-uniform air flows. These non-uniform air flows and vortices hamper performance of the gas turbine engine.

Accordingly, it is desirable to develop and design a system that prevents build-up of boundary layer and potential separation of air flow along the inner surface of a nacelle.

SUMMARY OF THE INVENTION

An example nacelle includes a noise attenuation panel in communication with air flowing along an inner surface in communication with a vacuum source to draw air through the noise attenuation panel.

A nacelle for a gas turbine engine defines an inner surface that includes a noise attenuation layer covered by a face sheet. The face sheet includes a plurality of holes to communicate sound energy along with airflow into the noise attenuation layer. A back sheet supports the noise attenuation layer in the nacelle and also includes a plurality of holes. A vacuum generating device creates a pressure differential across the noise attenuation panel for pulling airflow through the noise attenuation layer and away from the inner surface of the nacelle structure. Drawing air away from the inner surface of the nacelle prevents separation of the airflow from the inner surface. Maintaining airflow along the inner surface of the nacelle prevents formation of undesirable airflow characteristics that can degrade engine performance.

Accordingly, the example inlet control system provides stability of flow adjacent an inner surface of the nacelle structure.

These and other features of the present invention can be best understood from the following specification and drawings, the following of which is a brief description.

DETAILED DESCRIPTION OF THE PREFERRED EMBODIMENT

Figure 1:
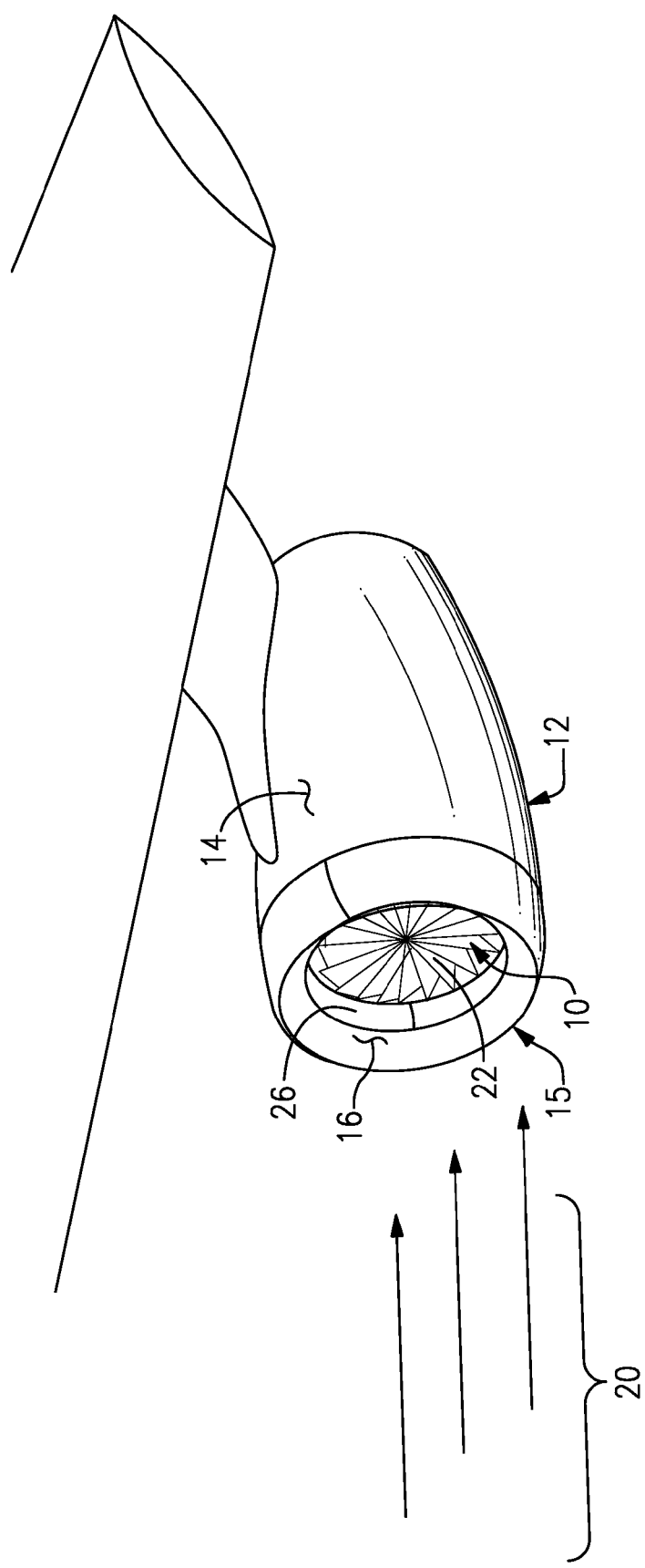
FIG. 1 is a schematic of an example engine nacelle.

Referring to FIG. 1, a gas turbine engine assembly 10 is disposed within a nacelle 12. The nacelle 12 includes an outer surface 14 and an inner surface 16. A leading edge 15 defines an inlet surface for airflow 20. Air flow 20 into the nacelle 12 is directed towards a fan 22 of the gas turbine engine assembly 10. The inner surface 16 is comprised of a plurality of panels 26 that provide for the attenuation of sound energy generated by the gas turbine engine 10. Although an under wing mounted nacelle 12 is illustrated by way of example, other nacelle mounting configurations such as for example fuselage mounted, over wing mounted, and even embedded within a fuselage or wing, will also benefit from the disclosed features.

Figure 2:
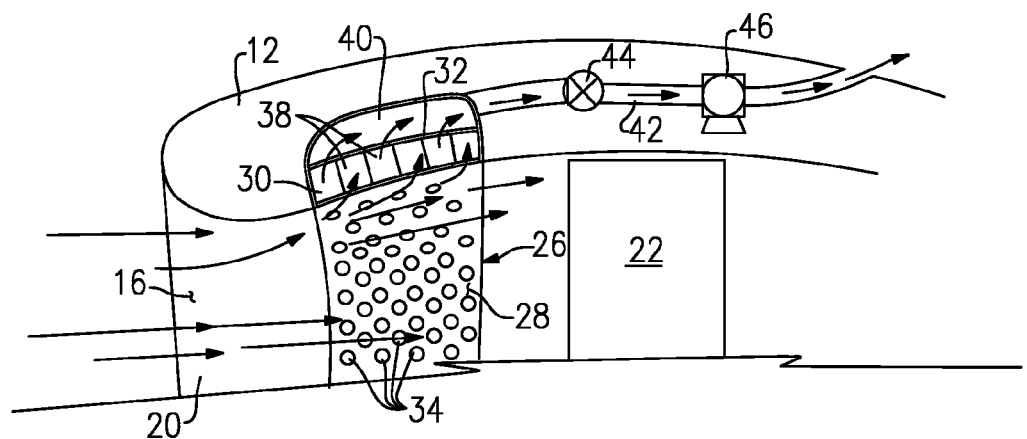
FIG. 2 is a schematic of a cross-section of an engine nacelle.

Referring to FIG. 2, the example nacelle 12 includes a panel 26 comprised of a face sheet 28 that covers a noise attenuation layer 30. The noise attenuation layer is comprised of a plurality of cells 38. The cells 38 provide for the dissipation of sound energy that is communicated through the face sheet 28. Airflow 20 into the nacelle 12 is partially sucked through the panel 26 and exhausted out of nacelle 12 away from the inner surface 16.

The removal of a portion of the airflow 20 increases stability to prevent separation of airflow from the inner surface 16. The panel 26 includes the face sheet 28 that includes a plurality of openings 34. The plurality of openings 34 communicate sound energy along with air through to the noise attenuation layer 30. The noise attenuation layer 30 is supported by a back sheet 32. The back sheet 32 also includes a plurality of holes and is in communication with a plenum 40. The plenum 40 is in turn in communication with a passage 42 that includes a control valve 44 and a vacuum source. In the illustrated example the vacuum source comprises a vacuum pump 46. The vacuum pump 46 creates a pressure differential across the panel 26 that draws in a portion of the airflow 20. Other vacuum sources such as an ejector or other device or method that generates a desired pressure differential.

A control valve 44 is included in the passage 42 between the vacuum pump 46 and the plenum 40. The example plenum 40 is disposed on a back side or non-airflow path side of the panel 26. The plenum 40 is maintained at a desired negative pressure by the vacuum pump 46 that generates the desired pressure differential in order to draw a portion of the airflow 20 therethrough.

The control valve 44 can vary or shut off airflow through the passage 42. Accordingly, airflow through the panel 26 can be tailored to meet specific operation requirements. In some operating conditions, the control valve 44 is closed to prevent airflow through the panel 26. The specific portion of airflow 20 that is drawn through the panel 26 will vary according to specific engine and airplane operation. Accordingly, the control valve 44 is variably adjustable in order to tailor the pressure differential communicated through the back side of the panel 26 to facilitate the desired control of the inlet airflow 20. During other operating conditions, with the control valve 44 in the closed position, the panel 26 continues to perform the noise attenuation function.

Figure 3:
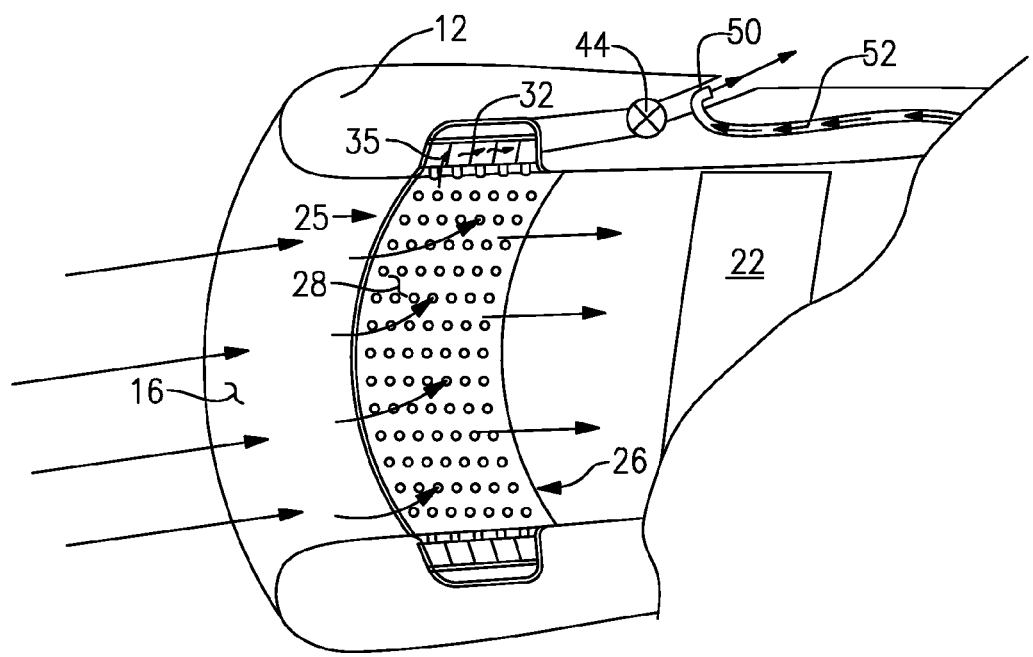
FIG. 3 is another example cross-section of an engine nacelle.

Referring to FIG. 3, another example nacelle structure 12 includes a panel 26 that has the face sheet 28 and the back sheet 32. In this example, no separate plenum is disposed at a back side of the panel 26. The example noise attenuation layer 35 includes openings between each cell such that the noise attenuation layer 35 performs the function of a plenum by communicating the negative pressure required to draw air therethrough.

In this example, a negative pressure is generated and is communicated into the noise attenuation layer 35 of the example panel 25 by an ejector 50 that is supplied with high speed air 52 from a portion of the gas turbine engine assembly 10 (not shown). The ejector 50 communicates the high speed airflow 52 to the rear of the panel 26 through the passage 42. This high speed airflow generates the desired negative pressure through the noise attenuation layer 25 that is required to draw the desired amount of airflow 20 into the panel 26.

As appreciated, in addition to the disclosed example vacuum pump 46 and ejector 50, other devices and methods for generating the desired pressure differential required to draw airflow through the panel are also within contemplation for use with the disclosed example inlet flow control system.

Figure 4:
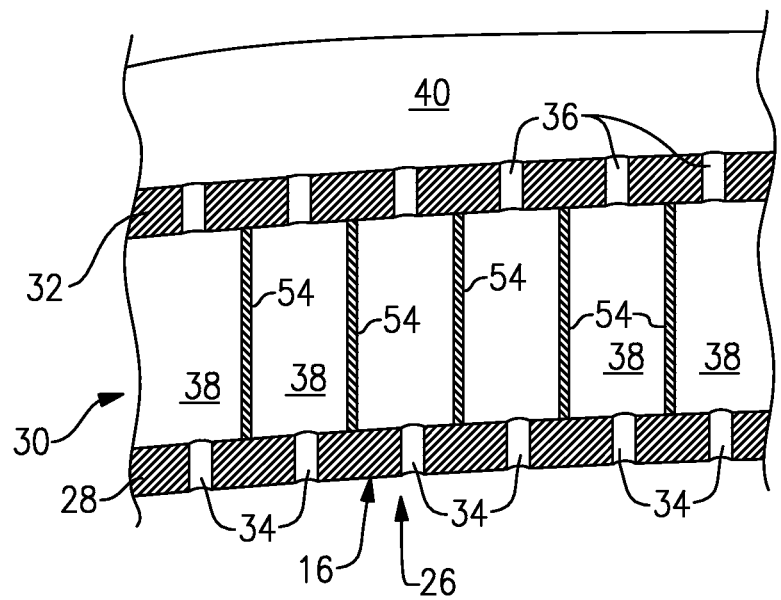
FIG. 4 is an enlarged cross-sectional view of an example noise attenuation structure.

Referring to FIG. 4, the noise attenuation layer 30 includes a plurality of cells 38 that are defined by a plurality of walls 54 that are disposed transversely to the inner surface 16. The plurality of cells 38 are covered by the face sheet 28 that includes the plurality of openings 34 that communicate with at least one of the cells 38. Each of the cells 38 is in communication with at least one of the plurality of openings within the face sheet 28.

The back sheet 32 includes a plurality of openings 36 that allow air to flow there through. Air flows through the panel 26 and into the plenum 40. The plenum 40 is in communication with the vacuum source 46 to create the desired pressure differential for drawing the desired amount of airflow 20 into and away from the inner surface 16.

Figure 5:
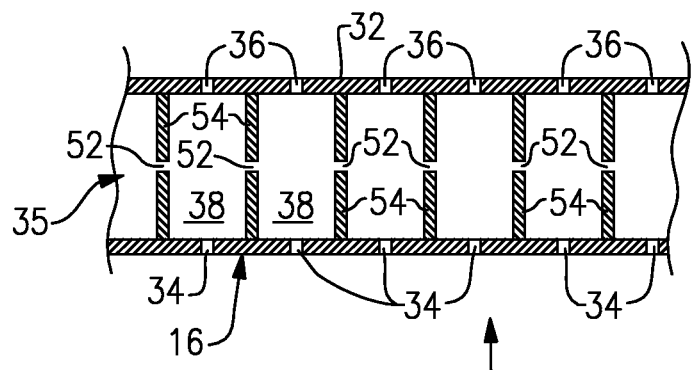
FIG. 5 is another cross-sectional view of another example noise attenuation structure.

Referring to FIG. 5, another example noise attenuation layer 35 includes a plurality of cells 38 and also a plurality of walls 54 that include holes 52 that communicate between the plurality of cells 38. No plenum is provided as the noise attenuation layer 35 performs the function of a plenum to communicate a negative pressure required to draw airflow away from the inner surface. The cross holes 52 provide for cross flow between the plurality of cells 38 that provide a substantially uniform pressure within the noise attenuation layer 35.

Accordingly, the example noise attenuation panel 26 provides for the removal of some portion of airflow through the inner surface 16 of the nacelle 12 to control and stabilize inlet flow to the gas turbine engine assembly. Further, although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for preventing separation of air flow from an inner surface of a nacelle for a gas turbine engine comprising the steps of:
    communicating air along the inner surface of the nacelle with a noise attenuation structure, wherein the noise attenuation structure comprises a face sheet including a plurality of openings communicating with a plurality of cells with uninterrupted solid walls, and a back sheet supporting the plurality of cells and including a plurality of openings in communication with the plurality of cells;
    generating a pressure differential to draw a portion of air flow along the inner surface through the noise attenuation structure and into a plenum in communication with the back sheet and each of the openings in the back sheet that correspond with the plurality of cells; and
    exhausting the portion of air flow drawn through the noise attenuation structure out of the nacelle with a vacuum source that draws air through the noise attenuation structure and away from the inner surface of the nacelle.

2. The method as recited in claim 1, including the step of communicating the pressure differential with substantially the entire back sheet of the noise attenuating structure.

3. The method as recited in claim 1, comprising generating a vacuum pressure with a vacuum pump.

4. The method as recited in claim 1, comprising generating a vacuum pressure with an ejector in communication with a plenum in communication with the noise attenuation structure.

5. The method as recited in claim 1, comprising varying the pressure differential to tailor the amount of air flow drawn away from said inner surface to current operating conditions.

6. The method as recited in claim 1, comprising the step of exhausting air drawn through the noise attenuation structure out through an outer surface of the nacelle.

7. The method as recited in claim 6, wherein the outer surface of the nacelle is disposed radially outward of the noise attenuation structure.

\* \* \* \* \*